United States Patent
Lin et al.

(10) Patent No.: US 11,895,516 B2
(45) Date of Patent: Feb. 6, 2024

(54) SPATIAL QUASI-CO-LOCATION FOR RADIO LINK MONITORING IN NEW RADIO MOBILE COMMUNICATIONS

(71) Applicant: MediaTek Inc., Hsinchu (TW)

(72) Inventors: Hsuan-Li Lin, Hsinchu (TW); Kuhn-Chang Lin, Hsinchu (TW); Tsang-Wei Yu, Hsinchu (TW)

(73) Assignee: MediaTek Inc., Taiwan (CN)

( * ) Notice: Subject to any disclaimer, the term of this patent is extended or adjusted under 35 U.S.C. 154(b) by 271 days.

(21) Appl. No.: 16/411,046

(22) Filed: May 13, 2019

(65) Prior Publication Data

US 2019/0349798 A1 Nov. 14, 2019

Related U.S. Application Data

(60) Provisional application No. 62/670,925, filed on May 14, 2018, provisional application No. 62/688,450, filed on Jun. 22, 2018.

(51) Int. Cl.
*H04W 24/08* (2009.01)
*H04L 5/00* (2006.01)

(52) U.S. Cl.
CPC .......... *H04W 24/08* (2013.01); *H04L 5/0048* (2013.01)

(58) Field of Classification Search
None
See application file for complete search history.

(56) References Cited

U.S. PATENT DOCUMENTS

| 2014/0092761 A1* | 4/2014 | Behravan | H04W 24/00 370/252 |
| 2016/0242231 A1* | 8/2016 | Vajapeyam | H04W 76/28 |
| 2017/0347270 A1 | 11/2017 | Iouchi et al. | |
| 2019/0052380 A1* | 2/2019 | Cui | H04W 48/12 |
| 2019/0200249 A1* | 6/2019 | Yoon | H04L 5/005 |
| 2019/0268790 A1* | 8/2019 | Kwon | H04W 24/10 |

(Continued)

FOREIGN PATENT DOCUMENTS

| CN | 103202050 A | 7/2013 |
| CN | 104205697 A | 12/2014 |

(Continued)

OTHER PUBLICATIONS

NTT Docomo, Inc., "Remaining issues on Radio link monitoring based on SSB", 3GPP TSG RAN WG4 Meeting #86, R4-1802538. (Year: 2018).*

China National Intellectual Property Administration, International Search Report and Written Opinion for International Patent Application No. PCT/CN2019/086811, dated Aug. 6, 2019.

(Continued)

*Primary Examiner* — Jeffrey M Rutkowski
*Assistant Examiner* — Mehedi S Aley
(74) *Attorney, Agent, or Firm* — Han IP PLLC; Andy M. Han

(57) ABSTRACT

Techniques and examples of determination of receiver (RX) beam for radio link monitoring (RLM) based on available spatial quasi-co-location (QCL) information in New Radio (NR) mobile communications are described. An apparatus receives downlink (DL) signaling from a network. The apparatus determines whether to extend an evaluation period of RLM based on a quasi-co-location (QCL) association provided in at least the DL signaling. The apparatus then executes extension of the evaluation period of the RLM, or not, based on a result of the determining.

10 Claims, 11 Drawing Sheets

(56) References Cited

U.S. PATENT DOCUMENTS

| | | | | |
|---|---|---|---|---|
| 2019/0274098 | A1* | 9/2019 | Cheng | H04W 76/19 |
| 2019/0320333 | A1* | 10/2019 | Koskela | H04B 7/0617 |
| 2019/0356439 | A1* | 11/2019 | Lee | H04L 5/0048 |
| 2020/0196161 | A1* | 6/2020 | Ahn | H04W 56/001 |
| 2020/0336194 | A1* | 10/2020 | Karjalainen | H04W 24/10 |
| 2020/0344019 | A1* | 10/2020 | Da Silva | H04L 1/1851 |
| 2020/0374717 | A1* | 11/2020 | He | H04L 5/0048 |
| 2021/0119688 | A1* | 4/2021 | Enescu | H04B 7/0404 |
| 2022/0240111 | A1* | 7/2022 | Jang | H04W 24/08 |

FOREIGN PATENT DOCUMENTS

| | | |
|---|---|---|
| CN | 104885503 A | 9/2015 |
| CN | 107210826 A | 9/2017 |
| WO | WO 2012061765 A1 | 5/2012 |
| WO | WO 2018082521 A1 | 5/2018 |
| WO | WO 2018084663 A1 | 5/2018 |

OTHER PUBLICATIONS

MediaTek Inc., Discussion on RLM, 3GPP TSG RAN WG4 NR AH Meeting #3, R4-1709335, Nagoya, Japan, Sep. 18-21, 2017.

Taiwan Intellectual Property Office, Office Action for Taiwan Patent Application No. 108116537, dated Sep. 30, 2020.

ZTE et al., Remaining details of RLM, 3GPP TSG RAN WG1 Meeting #92b, R1-1803612, Sanya, China, Apr. 16-20, 2018.

Huawei et al., Remaining details on NR RLM, 3GPP TSG RAN WG1 Meeting #92bis, R1-1803631, Sanya, China, Apr. 16-20, 2018.

Intel Corporation, Remaining details of RLM, 3GPP TSG RAN WG1 Meeting #92bis, R1-1804709, Sanya, China, Apr. 16-20, 2018.

China National Intellectual Property Administration, First Office Action for China Patent Application No. 201980002344.7, dated Jul. 20, 2022.

Intel Corporation; "Discussion on NR Radio Link Monitoring"; 3GPP TSG RAN WG1 Meeting RAN1 #89; R1-1707346; Hangzhou, China; May 15-19, 2017.

* cited by examiner

| RLM-RS CONFIGURATION | TCI STATE ID OF NZP CSI-RS |
|---|---|
| SSB INDEX = 1 | N/A |
| SSB INDEX = 2 | N/A |
| SSB INDEX = 3 | N/A |
| CSI-RS, ID = 0 | 2 |
| CSI-RS, ID = 2 | N/A |
| CSI-RS, ID = 3 | 3 |
| CSI-RS, ID = 4 | 4 |

INDIRECT QCL → X
INDIRECT QCL → X
DIRECT QCL → 0
INDIRECT QCL → 0
INDIRECT QCL → X
DIRECT QCL → X
INDIRECT QCL → X
DIRECT QCL → 0

TCI TABLE

| TCI STATE ID | RS |
|---|---|
| 1 | SSB INDEX = 1 |
| 2 | SSB INDEX = 2 |
| 3 | CSI-RS, ID = 2 |
| 4 | CSI-RS, ID = 1 |

| BM CONFIGURATION | TCI STATE ID OF NZP CSI-RS |
|---|---|
| SSB INDEX = 2 | N/A |
| SSB INDEX = 3 | N/A |
| CSI-RS, ID = 1 | 1 |
| CSI-RS, ID = 3 | 3 |

FIG. 3

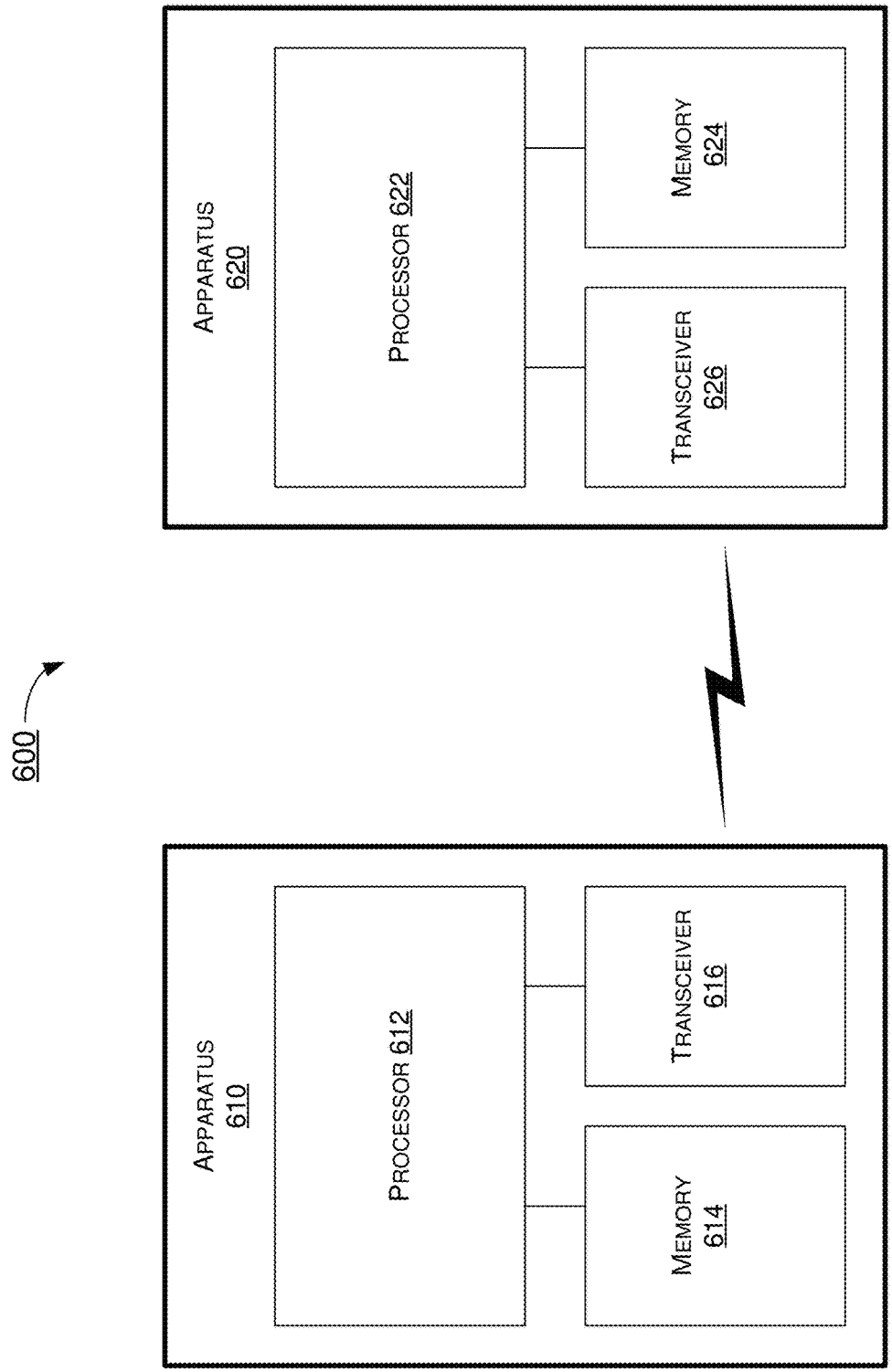

SPATIAL QUASI-CO-LOCATION FOR RADIO LINK MONITORING IN NEW RADIO MOBILE COMMUNICATIONS

CROSS REFERENCE TO RELATED PATENT APPLICATION

The present disclosure claims the priority benefit of U.S. Provisional Patent Application Nos. 62/670,925 and 62/688,450, filed on 14 May 2018 and 22 Jun. 2018, respectively. The contents of aforementioned applications are herein incorporated by reference in their entirety.

TECHNICAL FIELD

The present disclosure is generally related to mobile communications and, more particularly, to determination of receiver (RX) beam for radio link monitoring (RLM) based on available spatial quasi-co-location (QCL) information in New Radio (NR) mobile communications.

BACKGROUND

Unless otherwise indicated herein, approaches described in this section are not prior art to the claims listed below and are not admitted as prior art by inclusion in this section.

In $5^{th}$-Generation (5G) mobile communications, beam management (BM) is a particularly effective technique at high frequencies and is generally aimed at establishing and maintaining transmitting/receiving analog beam pairs between the base station and user equipment. For example, a user equipment (UE) compares the layer 1 (L1) reference signal received power (RSRP) of multiple synchronization signal (SS)/physical broadcast channel (PBCH) blocks and channel state information reference signal (CSI-RS) to which different beams have been applied by a base station, and the UE selects a suitable transmit beam to be reported to the base station. The base station reports the beam information applied to a downlink channel, so that the UE can select a corresponding reception (RX) beam to receive the downlink channel. As part of BM, a base station would transmit SSBs and CSI-RS in different direction and, correspondingly, the UE would perform beam sweeping. As there may a large number of directions to cover, beam sweeping could be time consuming. Thus, the UE always needs to extend an evaluation period for RLM for beam sweeping in BM.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method may involve a processor of an apparatus receiving downlink (DL) signaling from a network. The method may also involve the processor determining whether to extend an evaluation period of RLM based on a quasi-co-location (QCL) association provided in at least the DL signaling. The method may further involve the processor either executing extension of the evaluation period of the RLM, or not, based on a result of the determining.

In one aspect, an apparatus may include a transceiver and a processor coupled to the transceiver. During operation, the transceiver may wirelessly communicate with a network. The transceiver may include a plurality of receiver antennas and a plurality of transmitter antennas. The processor may be coupled to the transceiver. During operation, the processor may receive, via the transceiver, DL signaling from a network, determine whether to extend an evaluation period of RLM based on a QCL association provided in at least the DL signaling, and either execute extension of the evaluation period of the RLM, or not, based on a result of the determining.

It is noteworthy that, although description provided herein may be in the context of certain radio access technologies, networks and network topologies such as 5G/NR, the proposed concepts, schemes and any variation(s)/derivative(s) thereof may be implemented in, for and by other types of radio access technologies, networks and network topologies such as, for example and without limitation, LTE, LTE-Advanced, LTE-Advanced Pro, and Internet-of-Things (IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 3 is a diagram of an example scenario in accordance with an implementation of the present disclosure.

Each of FIG. 4A, FIG. 4B

Each of FIG. 5A

FIG. 6 is a block diagram of an example system in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Figure 1:
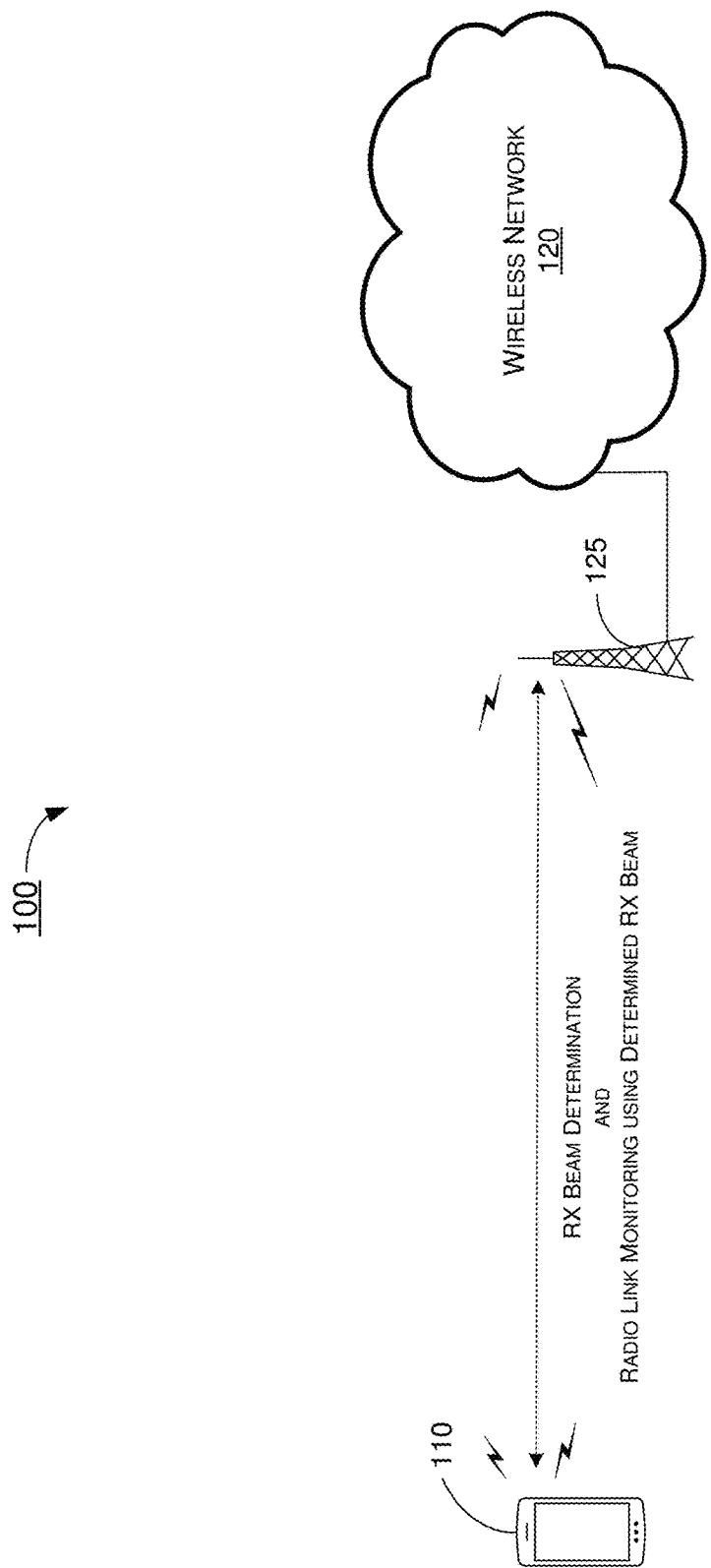
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. Referring to FIG. 1, network environment 100 may involve a user equipment (UE) 110 in wireless communication with a wireless network 120 (e.g., a 5G NR mobile network) via a base station 125 (e.g., a gNB or transmit-receive point (TRP)). In network environment 100, UE 110 may be in wireless communication with wireless network 120 via base station 125 to perform RX beam determination. For instance, UE 110 may determine its RX beam for RLM based on configured QCL in accordance with various proposed schemes as described below. Moreover, as RX beam sweeping can be performed in some tasks, RX beam sweeping needs not be performed during RLM measurement. Since the QCL information of SSB can be assumed to be the same when the SSB has the same SSB index (SBI), if RX beams have been determined for the SSB configured for RLM, then RX beam sweeping is not necessary. For a given SSB, the RX beams could be determined by SSB-based radio resource management (RRM), SSB-based BM, and CSI-RS-based BM.

With respect to RLM, there may be SSB-based RLM, under which there may be different cases. The different cases under SSB-based RLM are described below.

In a first case (case 1) under SSB-based RLM, with SSB-based RRM, if RX beam information can be provided by SSB-based RRM, UE 110 may be able to roughly determine its RX beam(s). However, the RX beam(s) used for RRM could be different from the RX beam(s) used for RLM. UE 110 may use wider RX beam(s) to cover SSBs from different and/or neighboring cells for RRM. However, for RLM and data reception, UE 110 would need some opportunity to refine the RX beam(s) to optimize its link quality. Consequently, the evaluation period of SSB-based RLM would need to be extended.

In a second case (case 2) under SSB-based RLM, with SSB-based BM, since both BM and RLM are related to a serving cell for UE 110, the same RX beam(s) can be used. However, if RX beam determination relies on SSB-based BM, UE 110 would need some time for BM to configure the RX beam(s). Consequently, the evaluation period of SSB-based RLM would need to be extended.

In a third case (case 3) under SSB-based RLM, with CSI-RS-based BM, when RX beam information can be provided by CSI-RS-based BM, UE 110 may be able to determine its RX beam(s) for the serving cell accordingly. Thus, there would be no need to extend the evaluation period of SSB-based RLM for RX beam sweeping if certain conditions are met. Such conditions include the following: all SSBs configured for RLM being spatially quasi-co-located to CSI-RS resources configured for BM, QCL association being provided, and CSI-RS resources being time-division multiplexed with the SSBs.

For CSI-RS, regarding whether two reference signals are time-division multiplexed, the timing location of each of the two reference signals may be determined according to the respective time offset and periodicity in radio resource control (RRC) signaling (e.g., non-zero power (NZP) CSI-RS configuration). Then, the timing locations of the two reference signals may be compared to determine whether they are time-division multiplexed. For SSB, regarding whether two reference signals are time-division multiplexed, the timing location of each of the two reference signals may be determined according to the respective SSB index and periodicity in RRC signaling (e.g., in an SSB configuration or a SS/PBCH block measurement time configuration (SMTC) configuration). Then, the timing locations of the two reference signals may be compared to determine whether they are time-division multiplexed.

With respect to RLM, there may be CSI-RS-based RLM, under which there may be different cases. The different cases under CSI-RS-based RLM are described below.

In a first case (case 1) under CSI-RS-based RLM, with SSB-based RRM, since the RX beam(s) used for RRM may be different from the RX beam(s) used for RLM, UE 110 would need some opportunity to refine the RX beams for data reception. Consequently, the evaluation period of SSB-based RLM would need to be extended.

In a second case (case 2) under CSI-RS-based RLM, with SSB-based BM, if all CSI-RS resources configured for RLM are spatially quasi-co-located to SSBs configured for BM while the CSI-RS resources are time-division multiplexed with the SSBs, then there would be no need to extend the evaluation period of SSB-based RLM for RX beam sweeping when the QCL association is provided.

In a third case (case 3) under CSI-RS-based RLM, with CSI-RS-based BM, if the CSI-RS resources configured for RLM are quasi-co-located and time-division multiplexed with the CSI-RS resources configured for BM, then there would be no need to extend the evaluation period of SSB-based RLM for RX beam sweeping when the QCL association is provided.

In view of the above, there may be several possible scenarios for avoid extending the evaluation period of SSB-based RLM for RX beam sweeping. For instance, the possible scenarios may include the following: explicit RLM reference signal (RLM-RS) with direct QCL, explicit RLM-RS with indirect QCL, inexplicit RLM-RS with direct QCL, inexplicit RLM-RS with indirect QCL, SSB-based RLM in combination with CSI-RS-based BM and indirect QCL, CSI-RS-based RLM in combination with SSB-based BM and direct QCL, and CSI-RS-based RLM in combination with SSB-based BM and indirect QCL.

It is noteworthy that, with respect to transmission configuration indication (TCI) states, QCL assumption provides synchronization information for properly configuring UE receiver(s). In particular, current 3GPP specification defines different types of QCL for NR with respect to antenna ports, namely: Doppler shift, Doppler spread, average delay, delay spread, and spatial RX parameter. Moreover, QCL information can be categorized into QCL types with QCL assumption provided via QCL types, including: QCL-Type A (Doppler shift, Doppler spread, average delay, delay spread), QCL-Type B (Doppler shift, Doppler spread), QCL-Type C (Doppler shift, average delay), and QCL-Type D (spatial RX parameter). It is also noteworthy that, with respect to downlink (DL) beam indication (e.g., beam indication for physical downlink control channel (PDCCH) and/or physical downlink shared channel (PDSCH)) for reference signal (RS) RX, spatial QCL may be provided through an association with one of a plurality of candidate TCI states (RRC:TCI-States). In the case of PDSCH, network 120 may, via RRC signaling, indicate one of 1~M candidate TCI states each of which corresponding to a respective reference RS (e.g., SSB or CSI-RS) and, by medium access control (MAC) control element (CE) activation, For example, reference signals for a P-2 procedure can be provided with a spatial QCL assumption so that UE 110 knows which UE RX beam should be used for measurement.

Accordingly, QCL may be indicated by TCI, which is related to a TCI state identification (ID) and a RS. In RLM-RS configuration, there is no QCL parameter. However, it remains an issue as to how UE 110 determines its RX beam for RLM according to the available QCL information configured by network 120. Thus, depending on the condition, there may not be sufficient time for RX beam sweeping for RLM. In particular, as current 3GPP specification defines a first frequency range (FR1) of 450 MHz~6000 MHz and a second frequency range (FR2) of 24250 MHz~52600 MHz, the estimated signal quality on the RS in FR2 cannot be guaranteed if RX beam sweeping is not performed. Furthermore, performing RX beam sweeping tends to increase the evaluation period and, as a result, the speed of channel quality response becomes slow. Accordingly, if the best RX beam information can be obtained from other procedure(s), then ideally no RX beam sweeping is to be performed for RLM-RS. It is also noteworthy that, for BM, the evaluation period for RLM would need to be extended when there is beam sweeping. However, when there is no beam sweeping, there would be no need to extend the evaluation period for RLM to save time and power consumption.

The present disclosure aims to provide solutions, schemes, concepts and/or designs that address aforementioned issues with respect to determination of the RX beam for RLM based on configured QCL. Under a proposed scheme in accordance with the present disclosure, UE 110 may perform several operations in for the determination of RX beam for RLM based on configured QCL. For instance, UE 110 may first determine which RS configuration is to be used for RLM. For a given RS configuration determined to be used for RLM, UE 110 may verify whether the RLM-RS is time-division multiplexed and spatially quasi-co-located to a RS for other tasks. Also, for the given RS configuration used for RLM, UE 110 may determine the RLM evaluation period. Then, UE 110 may determine the RX beam for the given RS configuration determined to be used for RLM.

Under the proposed scheme, regarding the determination of which RS configuration to use for RLM, UE 110 may proceed according to an approach for explicit RLM-RS and another approach for implicit RLM-RS. For instance, in an event that RLM-RS is explicitly configured by network 120, UE 110 may apply the configured RLM-RS configuration(s). On the other hand, in an event that RLM-RS is not explicitly configured UE 110 may apply a RS configuration used for a PDCCH, which may be indicated in a TCI table.

Under the proposed scheme, regarding the verification of whether the RLM-RS is time-division multiplexed and spatially quasi-co-located to a RS for other tasks other than RLM, UE 110 may verify whether the associated TCI state ID in the TCI table is used by one or more other tasks (other than RLM). This may be referred to as "indirect QCL" herein. In the case of explicit RLM-RS, UE 110 may check whether the configured RLM-RS is in the TCI table and whether its associated TCI state ID is used by one or more other tasks. In the case of implicit RLM-RS, UE 110 may check whether the TCI state ID associated to the RS configuration used for a PDCCH has been used by one or more other tasks (other than RLM). For CSI-RS, UE 110 may verify whether the associated RS in the configured TCI state ID is configured for one or more other tasks. This may be referred to as "direct QCL" herein. For instance, the configured TCI state ID may be in the NZP CSI-RS configuration. The "one or more other tasks" mentioned above may include, for example and without limitation, intra-frequency measurement, BM, beam failure detection, data reception via a PDSCH, and PDCCH reception.

Under the proposed scheme, regarding the determination of the RLM evaluation period, UE 110 may proceed differently for explicit RLM-RS and implicit RLM-RS. In the case of explicit RLM-RS, in an event that the configured RLM-RS is in the TCI table and the associated TCI state ID is used by one or more other tasks, the RLM evaluation period may not be extended by UE 110 for RX beam sweeping. In the case of implicit RLM-RS, in an event that the TCI state ID associated to the RS configuration used for a PDCCH has been used by one or more other tasks, the RLM evaluation period may not be extended by UE 110 for RX beam sweeping. Other than aforementioned cases, the RLM evaluation period may be extended by UE 110 for RX beam sweeping.

Under the proposed scheme, regarding the determination of the RX beam for a given RS configuration used for RLM, in an event that the RLM evaluation period is not be extended for RX beam sweeping, UE 110 may determine the RX beam as the RX beam(s) used for the TCI state ID, which has been used for one or more other tasks. Conversely, in an event that the RLM evaluation period is extended for RX beam sweeping, UE 110 may further refine or select the RX beam for RLM within the extended RLM evaluation period.

Figure 2:
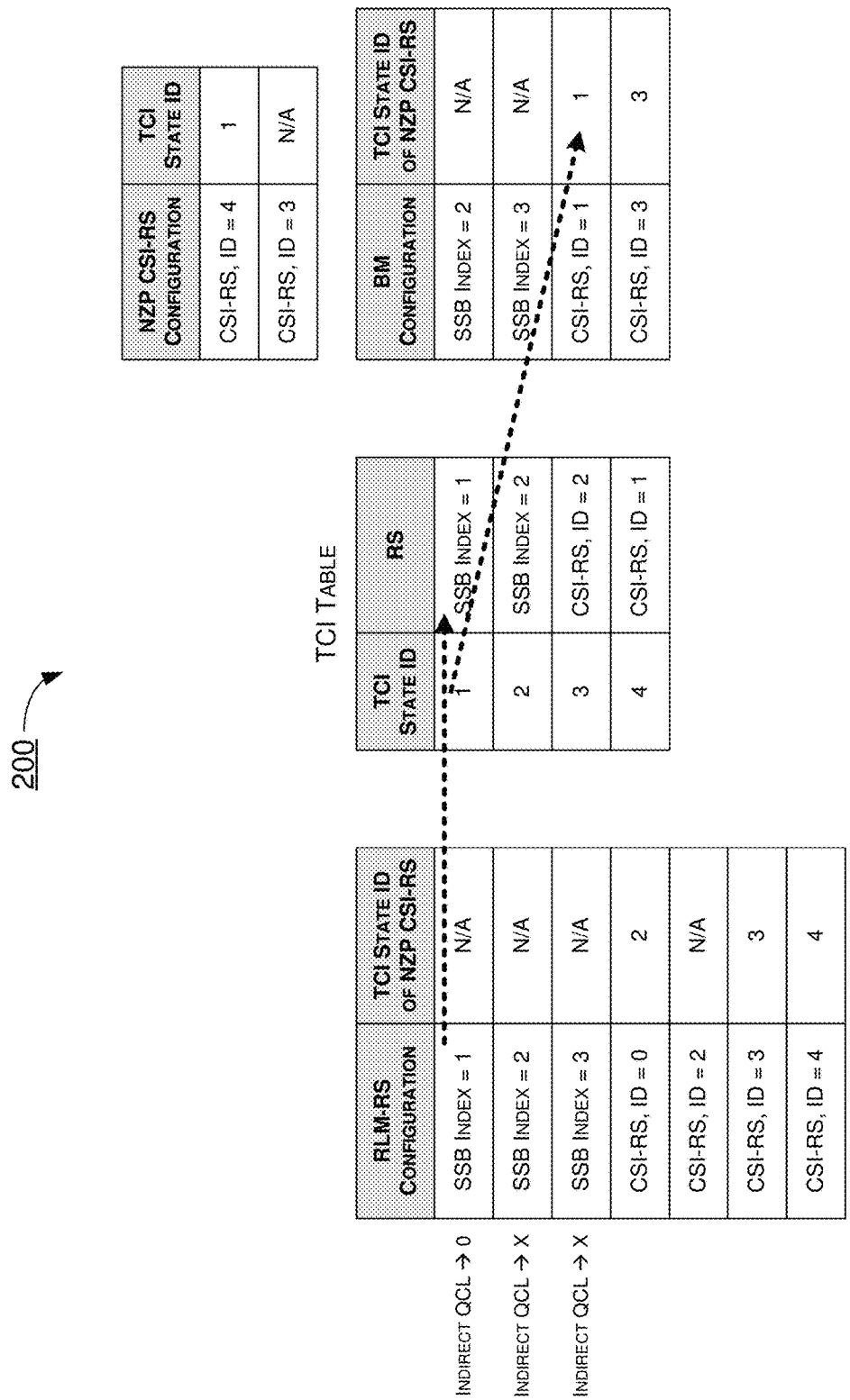
FIG. 2 is a diagram of an example scenario in accordance with an implementation of the present disclosure.

FIG. 2 illustrates an example scenario 200 in the context of network environment 100 in accordance with an implementation of the present disclosure. In scenario 200, configurations of RLM-RS and BM may be configured by network 120. In scenario 200, in an event that RLM-RS is explicitly configured by network 120, UE 110 may apply the configured RLM-RS configuration(s) for RX beam sweeping. Additionally, UE 110 may check whether the RLM-RS is time-division multiplexed and spatially quasi-co-located to BM reference signal (BM-RS). Various examples of indirect QCL and no QCL in scenario 200 are described below.

In the case of indirect QCL in scenario 200, as an example, SSB index=1 (interchangeably referred to as "SSB #1" herein) is spatially quasi-co-located to BM-RS, which is CSI-RS, ID=1 (interchangeably referred to as "CSI-RS #1" herein). Referring to FIG. 2, SSB #1 is in the TCI table, and its associated TCI state ID (which is 1) is used by "BM CSI-RS, ID=1." Hence, UE 110 may determine the RX beam for SSB #1 as the RX beam used for TCI state ID 1, provided by BM procedure.

In the case of no QCL in scenario 200, as an example, SSB index=2 (interchangeably referred to as "SSB #2" herein) is not time-division multiplexed and spatially quasi-co-located to BM-RS. Referring to FIG. 2, SSB #2 is in the TCI table, but its associated TCI state ID (which is 2) is not used by other tasks. Accordingly, UE 110 may extend the RLM evaluation period. It is noteworthy that, although SSB #2 is one BM-RS, it cannot be time-division multiplexed with itself. As another example, SSB index=3 interchangeably referred to as "SSB #3" herein) is not spatially quasi-co-located to BM-RS. Referring to FIG. 2, SSB #3 is not in the TCI table. Accordingly, UE 110 may extend the RLM evaluation period.

FIG. 3 illustrates an example scenario 300 in the context of network environment 100 in accordance with an implementation of the present disclosure. In scenario 300, configurations of RLM-RS and BM may be configured by network 120. In scenario 300, in an event that RLM-RS is explicitly configured by network 120, UE 110 may apply the configured RLM-RS configuration(s) for RX beam sweeping. Additionally, UE 110 may check whether the RLM-RS is time-division multiplexed and spatially quasi-co-located to BM-RS. Various examples of direct QCL, indirect QCL and no QCL in scenario 300 are described below.

In the case of direct QCL in scenario 300, as an example, CSI-RS ID=0 (interchangeably referred to as "CSI-RS #0" herein) is spatially quasi-co-located to BM-RS (SSB #2). Referring to FIG. 3, for TCI ID=2, the associated RS of TCI state is SSB #2, which is used in BM. UE 110 may determine the RX beam for CSI-RS #0 as the RX beam used for TCI state ID 2, provided by BM procedure(s). As another example, CSI-RS ID=4 (interchangeably referred to as "CSI-RS #4" herein) is spatially quasi-co-located to BM-RS (CSI-RS ID=1 (interchangeably referred to as "CSI-RS #1" herein)). Referring to FIG. 3, for TCI ID=4, the associated RS of TCI state is CSI-RS #1, which is used in BM. UE 110 may determine the RX beam for CSI-RS #1 as the RX beam used for TCI state ID 4, provided by BM procedure(s).

In the case of indirect QCL in scenario 300, as an example, CSI-RS ID=2 (interchangeably referred to as "CSI-RS #2" herein) is spatially quasi-co-located to BM-RS (CSI-RS ID=3 (interchangeably referred to as "CSI-RS #3" herein)). Referring to FIG. 3, CSI-RS #2 is in the TCI table, and its associated TCI state ID (which is 3) is used by "BM CSI-RS, ID=3." UE 110 may determine the RX beam for CSI-RS #2 as the RX beam used for TCI state ID 3, provided by BM procedure(s).

In the case of no QCL in scenario 300, as an example, CSI-RS #3 is not time-division multiplexed and spatially quasi-co-located to BM-RS. Referring to FIG. 3, for TCI ID=2, the associated RS of TCI state is CSI-RS #2, which is not used in BM. Accordingly, UE 110 may extend the RLM evaluation period. It is noteworthy that, although CSI-RS #3 is one BM-RS< it cannot be time-division multiplexed with itself.

Figure 4A:
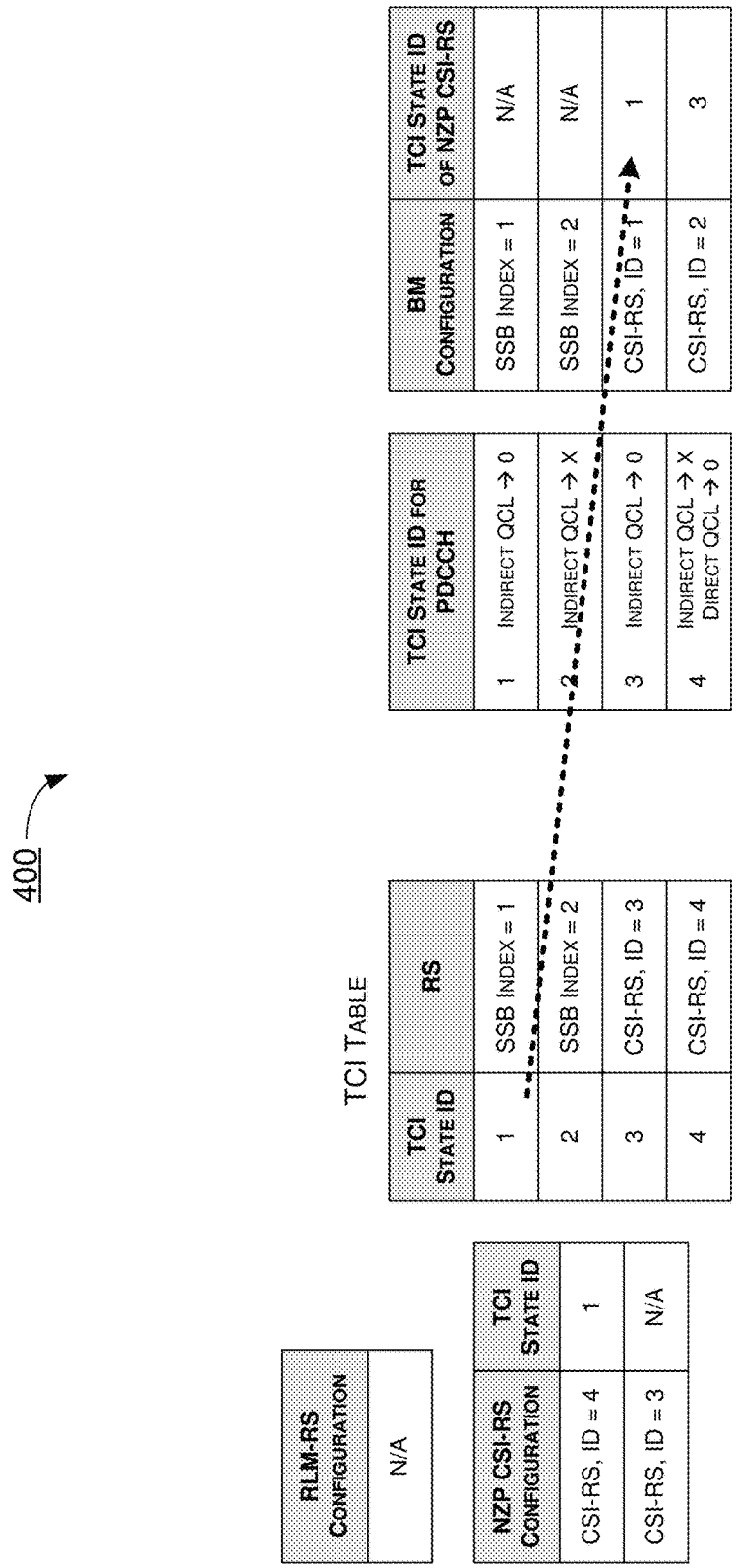
FIG. 4C is a diagram of a corresponding perspective of an example scenario in accordance with an implementation of the present disclosure.
Figure 4B:
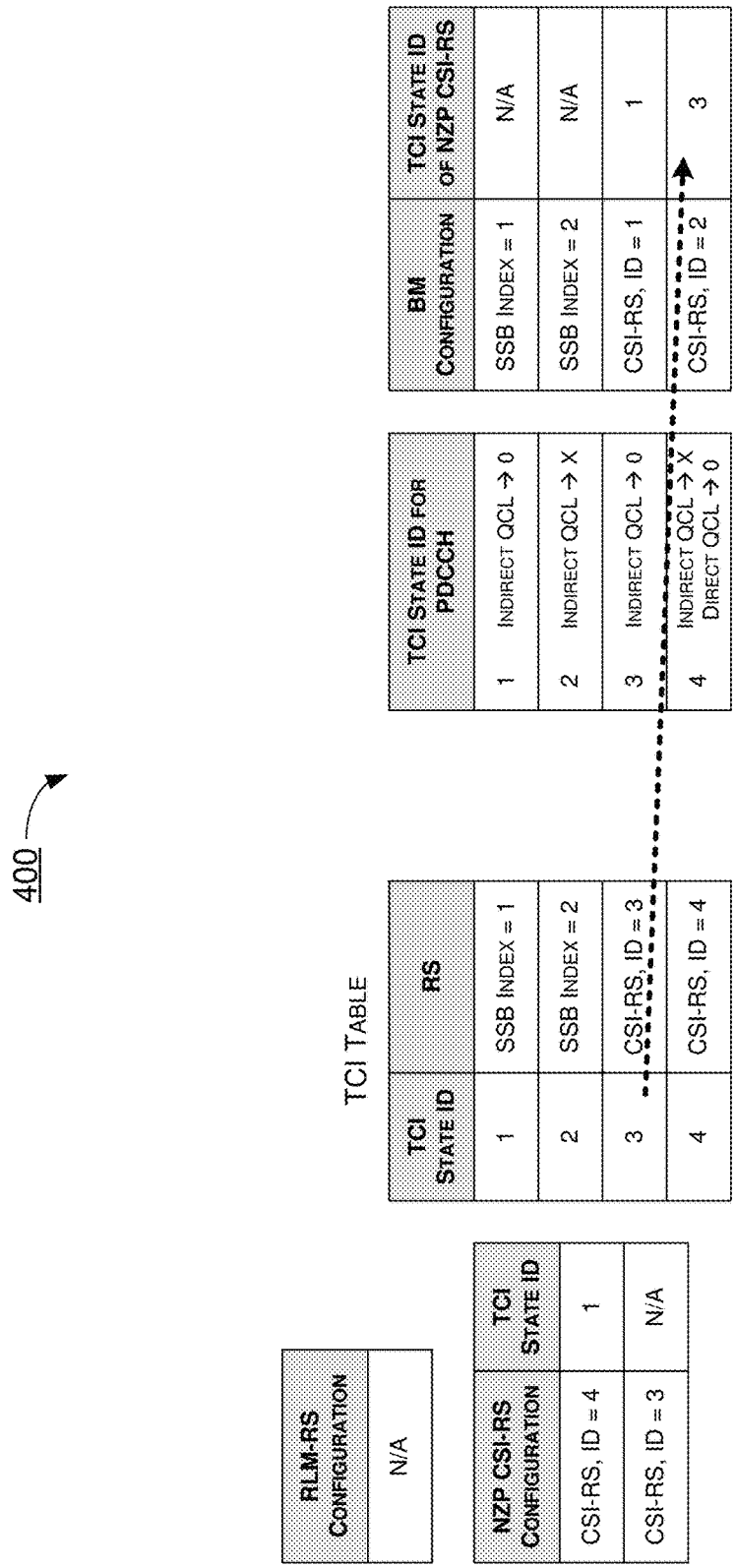
Figure 4C:
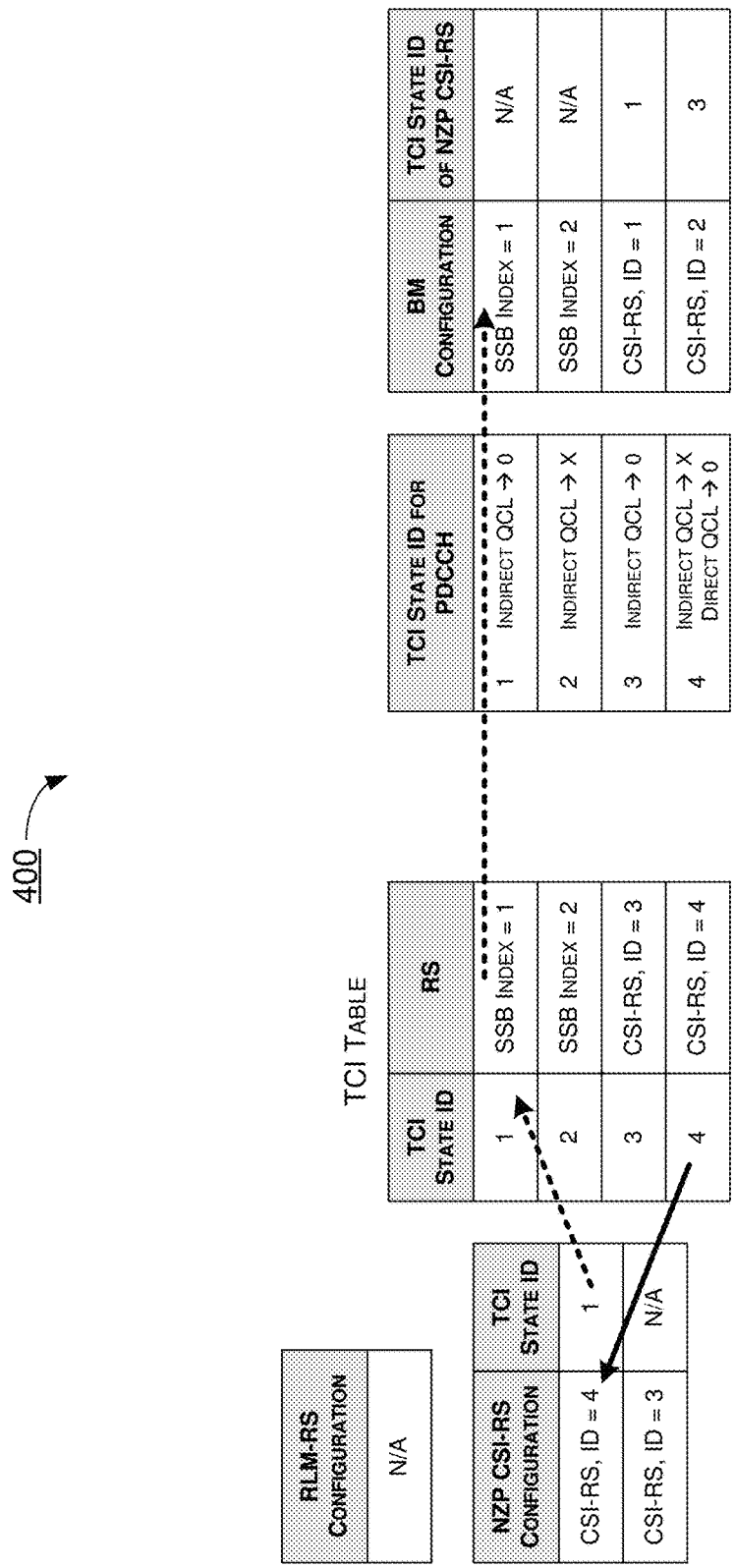

Each of FIG. 4A, FIG. 4B and FIG. 4C illustrates a corresponding perspective of an example scenario 400 in the context of network environment 100 in accordance with an implementation of the present disclosure. In scenario 400, configurations of BM may be configured by network 120, and TCI state for PDCCH may also be indicated by network 120. In scenario 300, in an event that RLM-RS is not explicitly configured by network 120, UE 110 may apply the RS configuration used for a PDCCH, which may be indicated in a TCI table. For instance, UE 110 may perform RLM on SSB index=1 and CSI-RS ID=1, 2, 3 according to the TCI state for PDCCH. Moreover, UE 110 may check whether the TCI state ID associated to the RS configuration used for a PDCCH has been used by one or more other tasks.

In the case of indirect QCL in scenario 400, as an example, SSB #1 is spatially quasi-co-located to BM-RS (CSI-RS #1). The TCI state ID (which is 1) associated to the RS configuration used for PDCCH has been used by BM-RS CSI-RS #1. This is shown in FIG. 4A. As another example, CSI-RS #3 is spatially quasi-co-located to BM-RS (CSI-RS #2). The TCI state ID (which is 3) associated to the RS configuration used for PDCCH has been used by BM-RS CSI-RS #2. This is shown in FIG. 4B.

In the case of direct QCL in scenario 400, as an example, CSI-RS #4 is spatially quasi-co-located to BM-RS (SSB #1). For CSI-RS #4, the configured TCI ID in NZP CSI-RS configuration is 1, and the associated RS of TCI state is SSB #1, which is used in BM. UE 110 may determine the RX beam for CSI-RS #4 as the RX beam used for TCI state ID 1, provided by BM procedure(s). This is shown in FIG. 4C.

In the case of no QCL in scenario 400, as an example, SSB #2 is not time-division multiplexed and spatially quasi-co-located to BM-RS. The TCI state ID (which is 2) associated to the RS configuration used for PDCCH has not been used by BM-RS. Accordingly, UE 110 may extend the RLM evaluation period. It is noteworthy that, although SSB #2 is one BM-RS, it cannot be time-division multiplexed with itself.

Under a proposed scheme in accordance with the present disclosure, a scaling factor (N) for RLM evaluation period may be introduced as a representation of an amount of extension of the RLM evaluation period. That is, when RLM evaluation period is not extended, $N=1$; and when RLM evaluation is extended, $N>1$.

For SSB in FR2, the RLM evaluation period may not be extended (e.g., $N=1$) in an event that the SSB configured for RLM is QCL-Type D and time-division multiplexed to CSI-RS resources configured for L1-RSRP reporting (e.g., BM), while the QCL association is known to UE 110. Otherwise, the RLM evaluation period may be extended (e.g., $N=8$).

For CSI-RS in FR2, the RLM evaluation period may not be extended (e.g., $N=1$) in an event that the CSI-RS resource configured for RLM is QCL-Type D and time-division multiplexed to CSI-RS resources configured for L1-RSRP reporting (e.g., BM) or SSBs configured for L1-RSRP reporting, while all CSI-RS resources configured for RLM are mutually time-division multiplexed and the QCL association is known to UE 110. Otherwise, the RLM evaluation period may be extended (e.g., $N=8$).

Figure 5A:
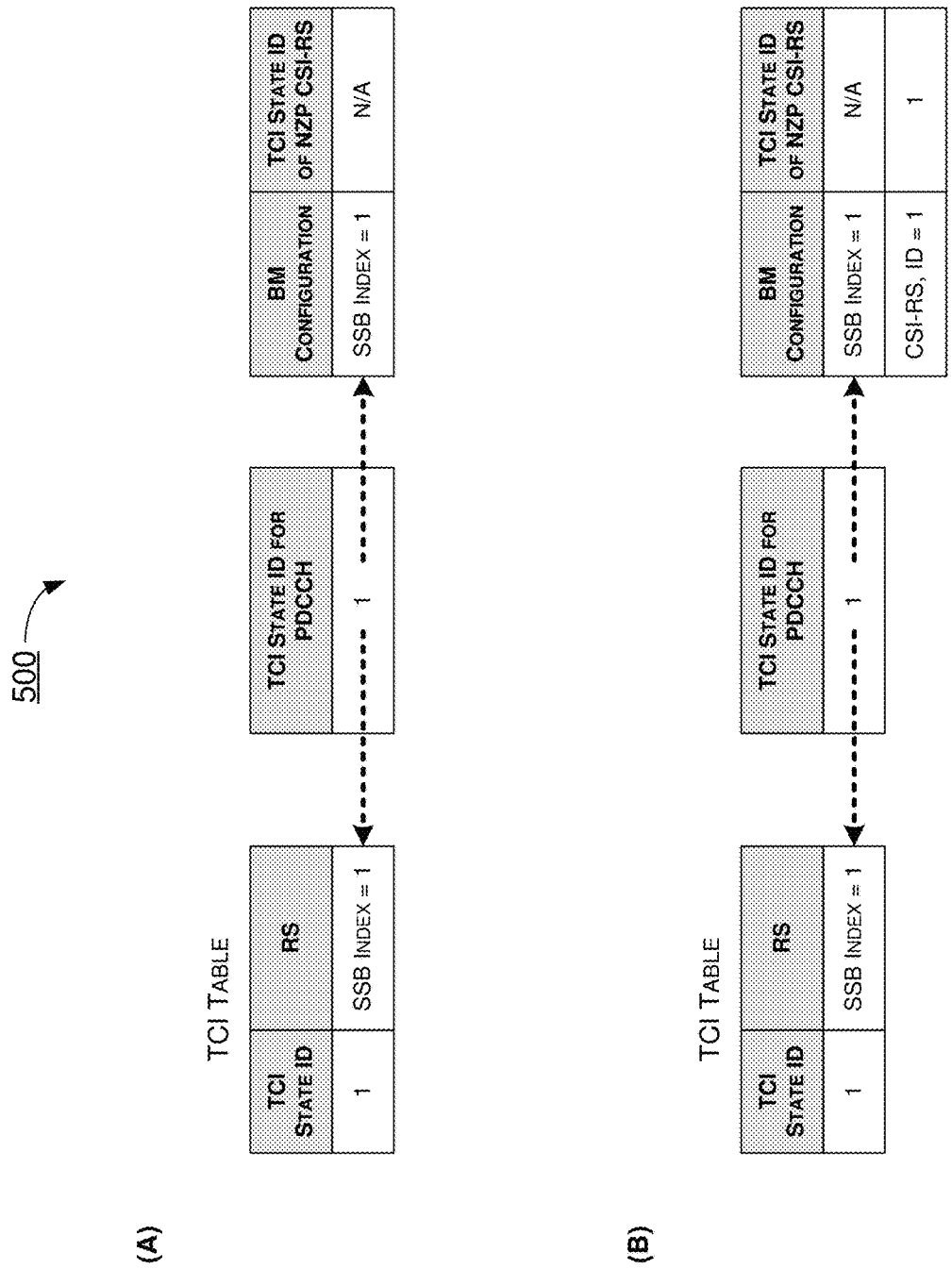
FIG. 5B is a diagram of a corresponding perspective of an example scenario in which various solutions and schemes in accordance with the present disclosure may be implemented.
Figure 5B:
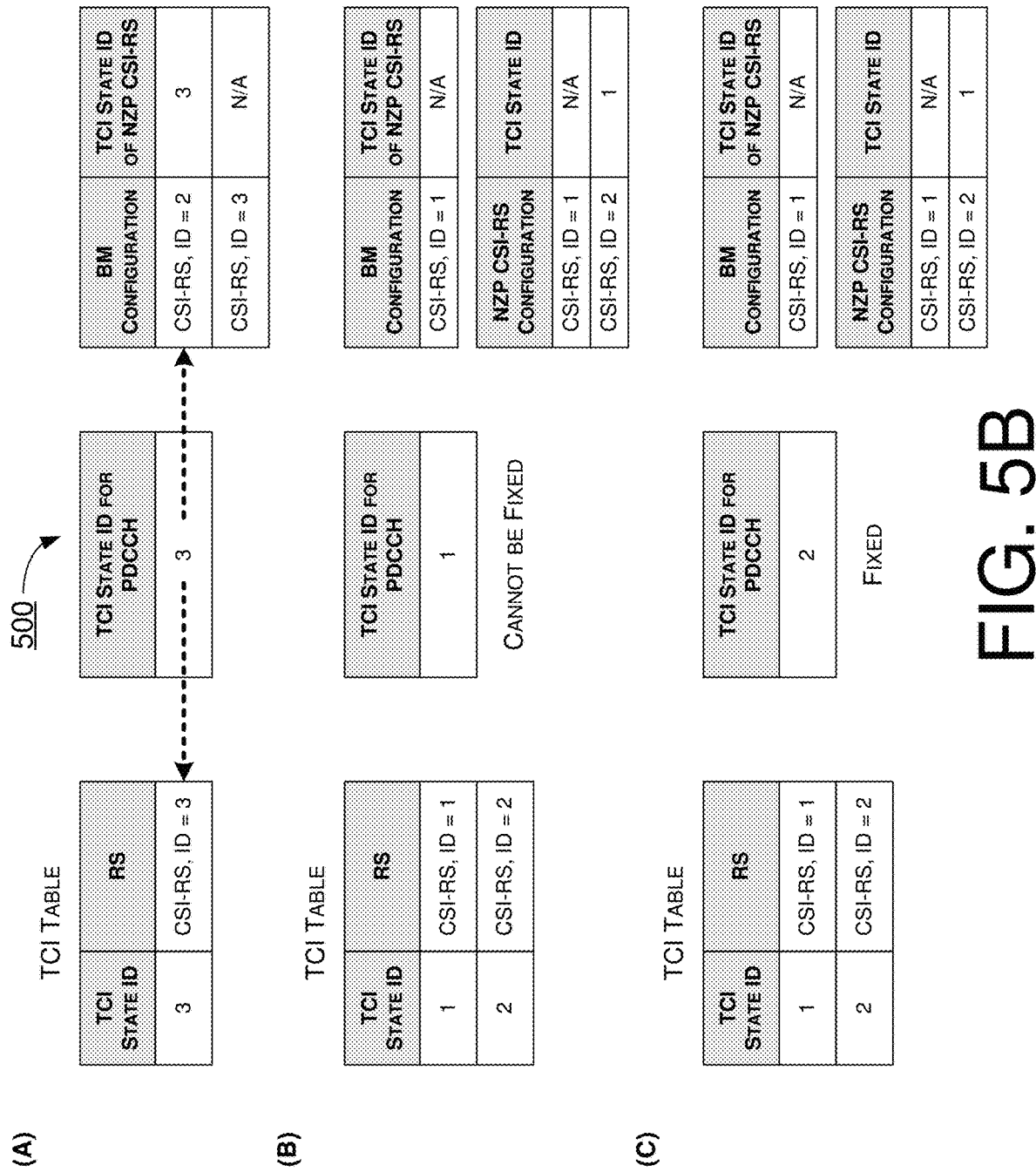

Each of FIG. 5A and FIG. 5B illustrates a corresponding perspective of an example scenario 500 in which various solutions and schemes in accordance with the present disclosure may be implemented. Referring to part (A) of FIG. 5A, an observation of RLM and bidirectional forwarding detection (BFD) on SSB may be made. However, SSB needs to be used for BM to train the beam. Accordingly, RX beam cannot be fixed or otherwise determined. Referring to part (B) of FIG. 5B, an observation may indicate that, while SSB #1 and CSI-RS #1 are quasi-co-located, which one should perform RX beam sweeping still needs to be determined. In this example, with CSI-RS TCI given, RX beam should be performed on SSB #1. However, SSB RX beam cannot be fixed or otherwise determined for SSB-based RLM as SSB cannot be configured for BM.

Referring to part (A) of FIG. 5B, an observation may indicate that, with CSI-RS #3 used to perform RX beam sweeping, RLM cannot be fixed or otherwise determined. Referring to part (B) of FIG. 5B, RX beam cannot be fixed or otherwise determined in this example. Referring to part (C) of FIG. 5B, RX beam can be fixed or otherwise determined in this example.

Illustrative Implementations

FIG. 6 illustrates an example system 600 having at least an example apparatus 610 and an example apparatus 620 in accordance with an implementation of the present disclosure. Each of apparatus 610 and apparatus 620 may perform various functions to implement schemes, techniques, processes and methods described herein pertaining to determination of RX beam for RLM based on available spatial QCL information in NR mobile communications, including the various schemes described above with respect to various proposed designs, concepts, schemes, systems and methods described above as well as process 600 described below. For instance, apparatus 610 may be an example implementation of UE 110, and apparatus 620 may be an example implementation of network node 125.

Each of apparatus 610 and apparatus 620 may be a part of an electronic apparatus, which may be a network apparatus or a UE (e.g., UE 110), such as a portable or mobile apparatus, a wearable apparatus, a wireless communication apparatus or a computing apparatus. For instance, each of apparatus 610 and apparatus 620 may be implemented in a smartphone, a smart watch, a personal digital assistant, a digital camera, or a computing equipment such as a tablet computer, a laptop computer or a notebook computer. Each of apparatus 610 and apparatus 620 may also be a part of a machine type apparatus, which may be an IoT apparatus such as an immobile or a stationary apparatus, a home apparatus, a wire communication apparatus or a computing apparatus. For instance, each of apparatus 610 and apparatus 620 may be implemented in a smart thermostat, a smart fridge, a smart door lock, a wireless speaker or a home control center. When implemented in or as a network apparatus, apparatus 610 and/or apparatus 620 may be implemented in a network node (e.g., network node 125), such as an eNB in an LTE, LTE-Advanced or LTE-Advanced Pro network or in a gNB or TRP in a 5G network, an NR network or an IoT network.

In some implementations, each of apparatus 610 and apparatus 620 may be implemented in the form of one or more integrated-circuit (IC) chips such as, for example and without limitation, one or more single-core processors, one or more multi-core processors, or one or more complex-instruction-set-computing (CISC) processors. In the various schemes described above, each of apparatus 610 and apparatus 620 may be implemented in or as a network apparatus or a UE. Each of apparatus 610 and apparatus 620 may include at least some of those components shown in FIG. 6 such as a processor 612 and a processor 622, respectively, for example. Each of apparatus 610 and apparatus 620 may further include one or more other components not pertinent to the proposed scheme of the present disclosure (e.g., internal power supply, display device and/or user interface device), and, thus, such component(s) of apparatus 610 and apparatus 620 are neither shown in FIG. 6 nor described below in the interest of simplicity and brevity.

In one aspect, each of processor 612 and processor 622 may be implemented in the form of one or more single-core processors, one or more multi-core processors, or one or more CISC processors. That is, even though a singular term "a processor" is used herein to refer to processor 612 and processor 622, each of processor 612 and processor 622 may include multiple processors in some implementations and a single processor in other implementations in accordance with the present disclosure. In another aspect, each of processor 612 and processor 622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 612 and processor 622 is a special-purpose machine specifically designed, arranged and configured to perform specific tasks including those pertaining to determination of RX beam for RLM based on available spatial QCL information in NR mobile communications in accordance with various implementations of the present disclosure.

In some implementations, apparatus 610 may also include a transceiver 616 coupled to processor 612. Transceiver 616 may be capable of wirelessly transmitting and receiving data. In some implementations, apparatus 620 may also include a transceiver 626 coupled to processor 622. Transceiver 626 may include a transceiver capable of wirelessly transmitting and receiving data.

In some implementations, apparatus 610 may further include a memory 614 coupled to processor 612 and capable of being accessed by processor 612 and storing data therein. In some implementations, apparatus 620 may further include a memory 624 coupled to processor 622 and capable of being accessed by processor 622 and storing data therein. Each of memory 614 and memory 624 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 614 and memory 624 may include a type of read-only memory (ROM) such as mask ROM, programmable ROM (PROM), erasable programmable ROM (EPROM) and/or electrically erasable programmable ROM (EEPROM). Alternatively, or additionally, each of memory 614 and memory 624 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 610 and apparatus 620 may be a communication entity capable of communicating with each other using various proposed schemes in accordance with the present disclosure. For illustrative purposes and without limitation, a description of capabilities of apparatus 610, as a UE, and apparatus 620, as a base station of a serving cell of a wireless network (e.g., 5G/NR mobile network), is provided below. It is noteworthy that, although the example implementations described below are provided in the context of a UE, the same may be implemented in and performed by a base station. Thus, although the following description of example implementations pertains to apparatus 610 as a UE (e.g., UE 110), the same is also applicable to apparatus 620 as a network node or base station such as a gNB, TRP or eNodeB (e.g., network node 125) of a wireless network (e.g., wireless network 120) such as a 5G NR mobile network.

Under a proposed scheme in accordance with the present disclosure, processor 612 of apparatus 610 may receive, via transceiver 616, DL signaling from a network (e.g., via apparatus 620). Additionally, processor 612 may determine whether to extend an evaluation period of RLM based on a quasi-co-location (QCL) association provided in at least the DL signaling. Moreover, processor 612 may either execute extension of the evaluation period of the RLM, or not, based on a result of the determining.

In some implementations, in determining whether to extend the evaluation period of the RLM based on the QCL association provided in at least the DL signaling, processor 612 may either determine not to extend the evaluation period for the RLM responsive to a condition being met or determine to extend the evaluation period for the RLM responsive to the condition not being met. In some implementations, the condition may include an RLM-RS for the RLM being spatially quasi-co-located according to the QCL association provided in at least the DL signaling.

In some implementations, the condition may also include the RLM-RS for the RLM being time-division multiplexed to CSI-RS resources configured for layer 1 reference signal received power (L1-RSRP) reporting according to the QCL association provided in at least the DL signaling.

In some implementations, the RLM-RS for the RLM may include an SSB reference signal configured for the RLM.

In some implementations, the condition may further include the RLM-RS for the RLM being time-division multiplexed to CSI-RS resources configured for L1-RSRP reporting or SSBs configured for L1-RSRP reporting according to the QCL association provided in at least the DL signaling.

In some implementations, the condition may further include all CSI-RS resources being mutually time-division multiplexed. In such cases, a plurality of RLM reference signals for the RLM may include a CSI-RS resource configured for the RLM.

In some implementations, in determining whether to extend the evaluation period of the RLM based on the QCL association provided in at least the DL signaling, processor 612 may determine whether to extend the evaluation period of the RLM in a second frequency range (FR2) as defined in the 3GPP specification.

In some implementations, processor 612 may perform additional operations. For instance, processor 612 may perform, via transceiver 616, receiver (RX) beam sweeping responsive to the determining indicating a need to extend the evaluation period of the RLM.

Under another proposed scheme in accordance with the present disclosure, processor 612 of apparatus 610 may determine whether, for an RS configuration used for RLM, an associated TCI state ID in a TCI table is used by one or more other tasks. Additionally, processor 612 may determine whether to extend an RLM evaluation period for the RS configuration used for the RLM. Moreover, processor 612 may determine a RX beam for the RS configuration used for the RLM. Furthermore, processor 612 may perform, via transceiver 616, the RLM using the determined RX beam with or without extending the evaluation period based on a result of the determining of whether to extend the evaluation period.

In some implementations, the one or more other tasks may include intra-frequency measurement, BM, beam failure detection, reception of a PDSCH, reception of a PDCCH, or a combination thereof.

In some implementations, for the RS configuration used for the RLM, in determining whether the associated TCI state ID in the TCI table is used by the one or more other tasks, processor 612 may check whether a configured RLM-RS is in the TCI table and whether the associated TCI state ID is used by the one or more other tasks. In such cases, the RLM-RS may be explicitly configured by a network (e.g., via apparatus 620).

In some implementations, in determining whether to extend the RLM evaluation period for the RS configuration used for the RLM, processor 612 may either determine not to extend the RLM evaluation period responsive to a condition being met or determine to extend the RLM evaluation period responsive to the condition not being met. In some implementations, the condition may include the configured RLM-RS being in the TCI table and the associated TCI state ID being used by the one or more other tasks.

In some implementations, in determining the RX beam for the RS configuration used for the RLM, processor 612 may perform certain operations. For instance, processor 612 may determine the RX beam as one or more RX beams used for the TCI state ID which has not been used by the one or more other tasks in an event that the RLM evaluation period is determined not to be extended. Alternatively, processor 612 may refine or select the RX beam for the RLM within an extended RLM evaluation period in an event that the RLM evaluation period is determined to be extended.

In some implementations, for the RS configuration used for the RLM, in determining whether the associated TCI state ID in the TCI table is used by the one or more other tasks, processor 612 may check whether a TCI state ID associated to the RS configuration and used for a PDCCH is used by the one or more other tasks, and wherein the RLM-RS is not explicitly configured by a network.

In some implementations, in determining whether to extend the RLM evaluation period for the RS configuration used for the RLM, processor 612 may either determine not to extend the RLM evaluation period responsive to a condition being met or determine to extend the RLM evaluation period responsive to the condition not being met. In some implementations, the condition may include the TCI state ID associated to the RS configuration used for the PDCCH being used by the one or more other tasks.

In some implementations, in determining the RX beam for the RS configuration used for the RLM, processor 612 may determine the RX beam as one or more RX beams used for the TCI state ID which has not been used by the one or more other tasks in an event that the RLM evaluation period is determined not to be extended. Alternatively, processor 612 may refine or select the RX beam for the RLM within an extended RLM evaluation period in an event that the RLM evaluation period is determined to be extended.

Illustrative Processes

Figure 7:
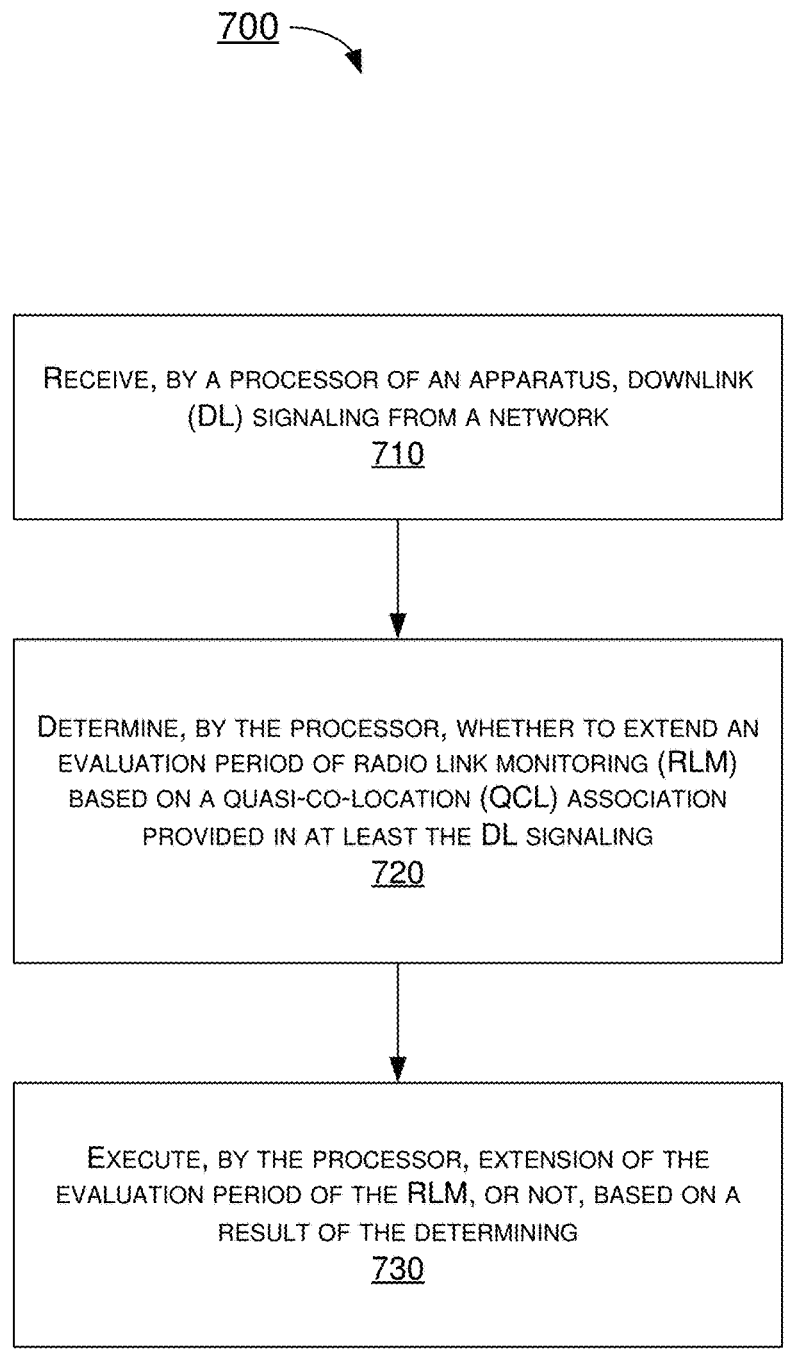
FIG. 7 is a flowchart of an example process in accordance with an implementation of the present disclosure.

FIG. 7 illustrates an example process 700 in accordance with an implementation of the present disclosure. Process 700 may represent an aspect of implementing various proposed designs, concepts, schemes, systems and methods described above. More specifically, process 700 may represent an aspect of the proposed concepts and schemes pertaining to determination of RX beam for RLM based on available spatial QCL information in NR mobile communications in accordance with the present disclosure. Process 700 may include one or more operations, actions, or functions as illustrated by one or more of blocks 710, 720 and 730. Although illustrated as discrete blocks, various blocks of process 700 may be divided into additional blocks, combined into fewer blocks, or eliminated, depending on the desired implementation. Moreover, the blocks/sub-blocks of process 700 may be executed in the order shown in FIG. 7 or, alternatively in a different order. Furthermore, one or more of the blocks/sub-blocks of process 700 may be executed repeatedly or iteratively. Process 700 may be implemented by or in apparatus 610 and apparatus 620 as well as any variations thereof. Solely for illustrative purposes and without limiting the scope, process 700 is described below in the context of apparatus 610 as a UE (e.g., UE 110) and apparatus 620 as a network node (e.g., network node 125) of a wireless network (e.g., wireless network 120) such as a 5G/NR mobile network. Process 700 may begin at block 710.

At 710, process 700 may involve processor 612 of apparatus 610 receiving, via transceiver 616, DL signaling from a network (e.g., via apparatus 620). Process 700 may proceed from 710 to 720.

At 720, process 700 may involve processor 612 determining whether to extend an evaluation period of RLM based on a quasi-co-location (QCL) association provided in at least the DL signaling. Process 700 may proceed from 720 to 730.

At 730, process 700 may involve processor 612 either executing extension of the evaluation period of the RLM, or not, based on a result of the determining.

In some implementations, in determining whether to extend the evaluation period of the RLM based on the QCL association provided in at least the DL signaling, process 700 may involve processor 612 either determining not to extend the evaluation period for the RLM responsive to a condition being met or determining to extend the evaluation period for the RLM responsive to the condition not being met. In some implementations, the condition may include an RLM-RS for the RLM being spatially quasi-co-located according to the QCL association provided in at least the DL signaling.

In some implementations, the condition may also include the RLM-RS for the RLM being time-division multiplexed to CSI-RS resources configured for layer 1 reference signal received power (L1-RSRP) reporting according to the QCL association provided in at least the DL signaling.

In some implementations, the RLM-RS for the RLM may include an SSB reference signal configured for the RLM.

In some implementations, the condition may further include the RLM-RS for the RLM being time-division multiplexed to CSI-RS resources configured for L1-RSRP reporting or SSBs configured for L1-RSRP reporting according to the QCL association provided in at least the DL signaling.

In some implementations, the condition may further include all CSI-RS resources being mutually time-division multiplexed. In such cases, a plurality of RLM reference signals for the RLM may include a CSI-RS resource configured for the RLM.

In some implementations, in determining whether to extend the evaluation period of the RLM based on the QCL association provided in at least the DL signaling, process 700 may involve processor 612 determining whether to extend the evaluation period of the RLM in a second frequency range (FR2) as defined in the 3GPP specification.

In some implementations, process 700 may further involve processor 612 performing additional operations. For instance, process 700 may involve processor 612 performing, via transceiver 616, receiver (RX) beam sweeping responsive to the determining indicating a need to extend the evaluation period of the RLM.

Figure 8:
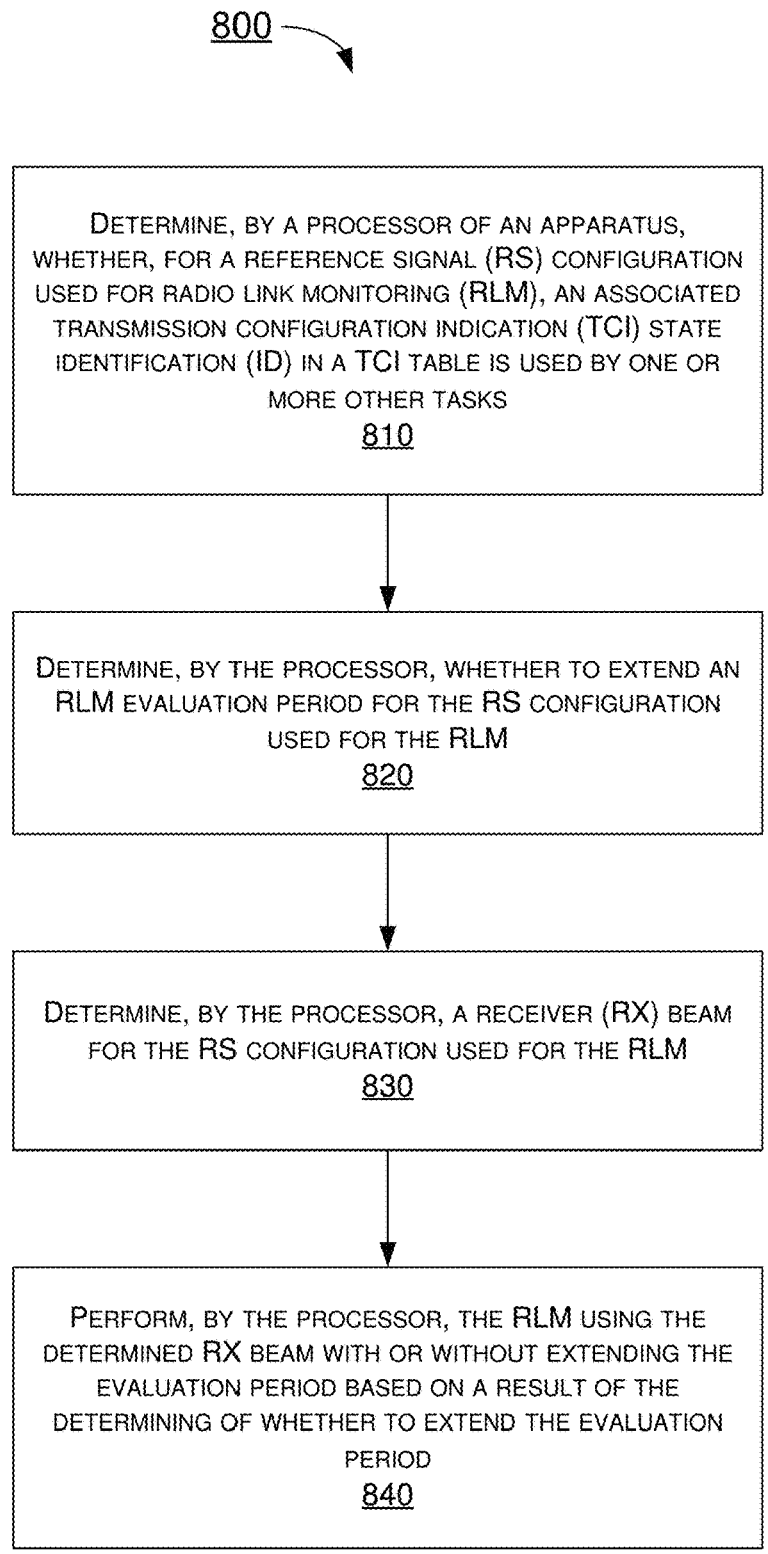
FIG. 8 is a flowchart of an example process in accordance with an implementation of the present disclosure.

FIG. 8 illustrates an example process 800 in accordance with an implementation of the present disclosure. Process 800 may represent an aspect of implementing various proposed designs, concepts, schemes, systems and methods described above. More specifically, process 800 may represent an aspect of the proposed concepts and schemes pertaining to determination of RX beam for RLM based on available spatial QCL information in NR mobile communications in accordance with the present disclosure. Process 800 may include one or more operations, actions, or functions as illustrated by one or more of blocks 810, 820, 830 and 840. Although illustrated as discrete blocks, various blocks of process 800 may be divided into additional blocks, combined into fewer blocks, or eliminated, depending on the desired implementation. Moreover, the blocks/sub-blocks of process 800 may be executed in the order shown in FIG. 8 or, alternatively in a different order. Furthermore, one or more of the blocks/sub-blocks of process 800 may be executed repeatedly or iteratively. Process 800 may be implemented by or in apparatus 610 and apparatus 620 as well as any variations thereof. Solely for illustrative purposes and without limiting the scope, process 800 is described below in the context of apparatus 610 as a UE (e.g., UE 110) and apparatus 620 as a network node (e.g., network node 125) of a wireless network (e.g., wireless network 120) such as a 5G/NR mobile network. Process 800 may begin at block 810.

At 810, process 800 may involve processor 612 of apparatus 610 determining whether, for an RS configuration used for RLM, an associated TCI state ID in a TCI table is used by one or more other tasks. Process 800 may proceed from 810 to 820.

At 820, process 800 may involve processor 612 determining whether to extend an RLM evaluation period for the RS configuration used for the RLM. Process 800 may proceed from 820 to 830.

At 830, process 800 may involve processor 612 determining a RX beam for the RS configuration used for the RLM. Process 800 may proceed from 830 to 840.

At 840, process 800 may involve processor 612 performing, via transceiver 616, the RLM using the determined RX beam with or without extending the evaluation period based on a result of the determining of whether to extend the evaluation period.

In some implementations, the one or more other tasks may include intra-frequency measurement, BM, beam failure detection, reception of a PDSCH, reception of a PDCCH, or a combination thereof.

In some implementations, for the RS configuration used for the RLM, in determining whether the associated TCI state ID in the TCI table is used by the one or more other tasks, process 800 may involve processor 612 checking whether a configured RLM-RS is in the TCI table and whether the associated TCI state ID is used by the one or more other tasks. In such cases, the RLM-RS may be explicitly configured by a network (e.g., via apparatus 620).

In some implementations, in determining whether to extend the RLM evaluation period for the RS configuration used for the RLM, process 800 may involve processor 612 either determining not to extend the RLM evaluation period responsive to a condition being met or determining to extend the RLM evaluation period responsive to the condition not being met. In some implementations, the condition may include the configured RLM-RS being in the TCI table and the associated TCI state ID being used by the one or more other tasks.

In some implementations, in determining the RX beam for the RS configuration used for the RLM, process 800 may involve processor 612 performing certain operations. For instance, process 800 may involve processor 612 determining the RX beam as one or more RX beams used for the TCI state ID which has not been used by the one or more other tasks in an event that the RLM evaluation period is determined not to be extended. Alternatively, process 800 may involve processor 612 refining or selecting the RX beam for the RLM within an extended RLM evaluation period in an event that the RLM evaluation period is determined to be extended.

In some implementations, for the RS configuration used for the RLM, in determining whether the associated TCI state ID in the TCI table is used by the one or more other tasks, process 800 may involve processor 612 checking whether a TCI state ID associated to the RS configuration and used for a PDCCH is used by the one or more other tasks, and wherein the RLM-RS is not explicitly configured by a network.

In some implementations, in determining whether to extend the RLM evaluation period for the RS configuration used for the RLM, process 800 may involve processor 612 either determining not to extend the RLM evaluation period responsive to a condition being met or determining to extend the RLM evaluation period responsive to the condition not being met. In some implementations, the condition may include the TCI state ID associated to the RS configuration used for the PDCCH being used by the one or more other tasks.

In some implementations, in determining the RX beam for the RS configuration used for the RLM, process 800 may involve processor 612 determining the RX beam as one or more RX beams used for the TCI state ID which has not been used by the one or more other tasks in an event that the RLM evaluation period is determined not to be extended. Alternatively, process 800 may involve processor 612 refining or selecting the RX beam for the RLM within an extended RLM evaluation period in an event that the RLM evaluation period is determined to be extended.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of an apparatus via a transceiver of the apparatus, downlink (DL) signaling from a network; and
   determining, by the processor, not to extend an evaluation period of radio link monitoring (RLM) responsive to a condition being met based on quasi-co-location (QCL) related information provided in at least the DL signaling,
   wherein the determining comprises determining based on an explicit RLM reference signal (RLM-RS) or an implicit RLM-RS,
   wherein the determining based on the explicit RLM-RS comprises determining not to increase a scaling factor for the evaluation period for receiving (RX) beam sweeping in an event that:
      an RLM-RS is configured with an associated transmission configuration indication (TCI) state identification (ID) which is in a TCI table, and
      the associated TCI state ID is associated to a beam management (BM) configuration in a BM configuration list;
   wherein the determining based on the implicit RLM-RS comprises determining not to increase a scaling factor for the evaluation period for the RX beam sweeping in an event that a TCI state ID associated to a reference signal (RS) configuration for a physical downlink control channel (PDCCH) is associated to a BM configuration in a BM configuration list,
wherein the condition comprises that the explicit RLM-RS or the implicit RLM-RS is time-division multiplexed with synchronization signal blocks (SSBs).

2. The method of claim 1, condition comprises a channel state information reference signal (CSI-RS) resource for the RLM being spatially quasi-co-located to the SSBs configured for a layer 1 reference signal received power (L1-RSRP) reporting, and wherein the condition further comprises the CSI-RS for the RLM being time-division multiplexed to the CSI-RS resources configured for the L1-RSRP reporting or the SSBs configured for the L1-RSRP reporting according to the QCL related information provided in at least the DL signaling.

3. The method of claim 2, wherein the condition further comprises all CSI-RS resources being mutually time-division multiplexed.

4. The method of claim 1, further comprising:
verifying whether the associated TCI state ID in the TCI table is used by one or more tasks other than the RLM.

5. The method of claim 1, further comprising:
verifying whether an associated RS in a configured TCI state ID is configured for one or more other tasks.

6. An apparatus, comprising:
a transceiver which, during operation, wirelessly communicates with a network, the transceiver comprising a plurality of receiver antennas and a plurality of transmitter antennas; and
a processor coupled to the transceiver such that, during operation, the processor performs operations comprising:
receiving, via the transceiver, downlink (DL) signaling from a network; and
determining not to extend an evaluation period of radio link monitoring (RLM) responsive to a condition being met based on quasi-co-location (QCL) related information provided in at least the DL signaling,
wherein the determining comprises determining based on an explicit RLM reference signal (RLM-RS) or an implicit RLM-RS,
wherein the determining based on the explicit RLM-RS comprises determining not to increase a scaling factor for the evaluation period for receiving (RX) beam sweeping in an event that:
an RLM-RS is configured with an associated transmission configuration indication (TCI) state identification (ID) which is in a TCI table, and
the associated TCI state ID is associated to a beam management (BM) configuration in a BM configuration list;
wherein the determining based on the implicit RLM-RS comprises determining not to increase a scaling factor for the evaluation period for the RX beam sweeping in an event that a TCI state ID associated to a reference signal (RS) configuration for a physical downlink control channel (PDCCH) is associated to a BM configuration in a BM configuration list,
wherein the condition comprises that the explicit RLM-RS or the implicit RLM-RS is time-division multiplexed with synchronization signal blocks (SSBs),
wherein the condition comprises a channel state information reference signal (CSI-RS) resource for the RLM being spatially quasi-co-located to the SSBs configured for a layer 1 reference signal received power (L1-RSRP) reporting.

7. The apparatus of claim 6, condition comprises a channel state information reference signal (CSI-RS) resource for the RLM being spatially quasi-co-located to the SSBs configured for a layer 1 reference signal received power (L1-RSRP) reporting, and wherein the condition further comprises the CSI-RS for the RLM being time-division multiplexed to the CSI-RS resources configured for the L1-RSRP reporting or the SSBs configured for the L1-RSRP reporting according to the QCL related information provided in at least the DL signaling.

8. The apparatus of claim 7, wherein the condition further comprises all CSI-RS resources being mutually time-division multiplexed.

9. The apparatus of claim 6, wherein the processor is configured to further perform operations comprising:
verifying whether the associated TCI state ID in the TCI table is used by one or more tasks other than the RLM.

10. The apparatus of claim 6, wherein the processor is configured to further perform operations comprising:
verifying whether an associated RS in a configured TCI state ID is configured for one or more other tasks.

* * * * *